(12) United States Patent
Gohlke

(10) Patent No.: US 7,395,835 B1
(45) Date of Patent: Jul. 8, 2008

(54) AIR ADMITTANCE VALVE

(75) Inventor: Henry J. Gohlke, Houston, TX (US)

(73) Assignee: Rectorseal Corporation, Houston, TX (US)

( * ) Notice: Subject to any disclaimer, the term of this patent is extended or adjusted under 35 U.S.C. 154(b) by 332 days.

(21) Appl. No.: 11/059,134

(22) Filed: Feb. 16, 2005

(51) Int. Cl.
*F16K 15/06* (2006.01)
*E03F 5/08* (2006.01)

(52) U.S. Cl. .................. 137/526; 137/533.25; 137/550; 251/356

(58) Field of Classification Search .................. 137/526, 137/533.25, 550; 251/358, 356
See application file for complete search history.

(56) References Cited

U.S. PATENT DOCUMENTS

| | | | |
|---|---|---|---|
| 209,975 A * | 11/1878 | Morey | 137/533.25 |
| 675,342 A | 5/1901 | Sayers | |
| 711,304 A | 10/1902 | George | |
| 793,989 A | 7/1905 | Clark | |
| 1,053,992 A * | 2/1913 | Hewitt | 251/358 |
| 1,111,633 A | 9/1914 | Young | |
| 1,303,529 A | 5/1919 | York | |
| 1,578,766 A | 3/1926 | Schwemlein | |
| 1,627,840 A | 5/1927 | Donnelly | |
| 1,628,069 A | 5/1927 | Schmidt et al. | |
| 1,681,697 A | 8/1928 | Brooks | |
| 2,028,581 A | 1/1936 | Zinkil | |
| 2,096,844 A | 10/1937 | Cekal | |
| 2,216,808 A | 10/1940 | Delany | |
| 2,346,022 A | 4/1944 | Gonia | |
| 2,405,241 A | 8/1946 | Smith | |
| 2,507,535 A | 5/1950 | Madsen | |
| 2,507,536 A | 5/1950 | Goodson | |
| 2,688,499 A | 9/1954 | Hanson | |
| 2,872,938 A | 2/1959 | Hansen | |
| 2,908,941 A | 10/1959 | Sabo et al. | |
| 2,928,413 A | 3/1960 | Hansen | |
| 2,940,464 A | 6/1960 | Moen | |
| 3,092,139 A | 6/1963 | Rodgers et al. | |
| 3,207,171 A | 9/1965 | Kryman | |
| 3,210,056 A | 10/1965 | Van't Sant | |
| 3,414,273 A | 12/1968 | Sumner | |
| 3,493,236 A | 2/1970 | Kleindienst | |
| 3,513,875 A | 5/1970 | Nelson | |

(Continued)

FOREIGN PATENT DOCUMENTS

DE          969 650          6/1958

(Continued)

OTHER PUBLICATIONS

"McClellan Anti-Syphon Trap Vent," Crane Company, 1893, p. 254, USA.

*Primary Examiner*—John Rivell
(74) *Attorney, Agent, or Firm*—Jones & Smith, LLP; E. Randall Smith (57) ABSTRACT

In some embodiments, an air admittance valve includes a base, a screen plate and a diaphragm engageable with the screen plate. The diaphragm may include a first center disk having a stem and a membrane coupled to the first center disk. The membrane may have a continuous material sized to extend beyond a perimeter of the first center disk, be formed of a material more pliable than the first center disk and be adapted to be coupled to the first center disk through the center disk stem.

21 Claims, 4 Drawing Sheets

U.S. PATENT DOCUMENTS

| | | |
|---|---|---|
| 3,654,965 A | 4/1972 | Gramain |
| 3,696,242 A | 10/1972 | Patry |
| 3,857,589 A | 12/1974 | Oostenbrink |
| 3,862,281 A | 1/1975 | Uchiyama |
| 3,913,928 A | 10/1975 | Yamaguchi |
| 3,923,081 A | 12/1975 | Persson |
| 4,040,670 A | 8/1977 | Williams |
| 4,071,043 A | 1/1978 | Carlson |
| 4,091,837 A | 5/1978 | Edmunds et al. |
| 4,198,726 A | 4/1980 | Powell, Jr. |
| 4,211,423 A | 7/1980 | Resech |
| 4,212,314 A | 7/1980 | Ericson |
| 4,224,044 A | 9/1980 | King |
| 4,232,706 A | 11/1980 | Ericson |
| 4,278,107 A | 7/1981 | Dugge et al. |
| 4,318,547 A | 3/1982 | Ericson |
| 4,323,096 A | 4/1982 | Dugge et al. |
| 4,398,557 A | 8/1983 | Dugge |
| 4,436,107 A | 3/1984 | Persson |
| 4,440,406 A | 4/1984 | Ericson |
| 4,493,339 A | 1/1985 | Porter, Jr. |
| 4,518,014 A | 5/1985 | McAlpine |
| 4,535,807 A | 8/1985 | Ericson |
| 4,545,398 A | 10/1985 | van Olst |
| 4,556,084 A | 12/1985 | Frawley |
| 4,643,221 A | 2/1987 | Parker |
| 4,656,315 A | 4/1987 | Rathmachers et al. |
| 4,712,574 A | 12/1987 | Perrott |
| 4,861,462 A | 8/1989 | Lehmann et al. |
| 4,867,802 A | 9/1989 | Earl |
| 4,886,085 A | 12/1989 | Miller |
| 4,974,632 A | 12/1990 | Ericson |
| 4,991,623 A | 2/1991 | Ericson |
| 5,048,562 A | 9/1991 | Frawley |
| 5,105,848 A | 4/1992 | Kallenbach |
| 5,117,860 A | 6/1992 | Horner, Jr. |
| 5,161,573 A | 11/1992 | Krupp |
| 5,197,510 A | 3/1993 | Kozlowski |
| 5,213,127 A | 5/1993 | Sorensen |
| 5,213,268 A | 5/1993 | Gnauert et al. |
| 5,230,363 A | 7/1993 | Winn, Jr. et al. |
| 5,273,068 A | 12/1993 | Duren |
| 5,279,439 A | 1/1994 | Kasugai et al. |
| 5,285,547 A | 2/1994 | Sebor |
| 5,301,718 A | 4/1994 | Bolhofner |
| 5,311,902 A | 5/1994 | Overfield |
| 5,363,877 A | 11/1994 | Frentzel et al. |
| 5,363,878 A | 11/1994 | Atkins |
| 5,365,964 A | 11/1994 | Sorensen |
| 5,402,822 A | 4/1995 | Brouwer et al. |
| 5,411,054 A | 5/1995 | Overfield |
| 5,419,366 A | 5/1995 | Johnston |
| 5,441,679 A | 8/1995 | Chalich |
| 5,535,900 A | 7/1996 | Huang |
| 5,564,457 A | 10/1996 | Beck |
| RE35,532 E | 6/1997 | Duren |
| 5,682,624 A | 11/1997 | Ciochetti |
| 5,706,854 A | 1/1998 | Haynes |
| 5,725,099 A | 3/1998 | Ericson |
| 5,803,112 A | 9/1998 | Andersson |
| 5,836,345 A | 11/1998 | Ericson |
| 5,881,759 A | 3/1999 | Andersson |
| 5,983,929 A * | 11/1999 | Andersson .................. 137/526 |
| 6,308,731 B1 * | 10/2001 | Kawasaki .................. 137/526 |
| 6,415,816 B1 * | 7/2002 | Beckey et al. ............... 137/526 |
| 6,532,988 B1 * | 3/2003 | Ericson ..................... 137/526 |

FOREIGN PATENT DOCUMENTS

| | | |
|---|---|---|
| DE | 26 35 412 A1 | 2/1978 |
| FR | 2 307 641 | 11/1976 |
| GB | 163414 | 2/1920 |
| GB | 1069239 | 5/1967 |
| GB | 2 073 857 A | 10/1981 |
| GB | 2 112 906 A | 7/1983 |
| GB | 2 164 128 A | 3/1986 |
| JP | 59-37328 | 2/1984 |
| JP | 59-91221 | 5/1984 |

* cited by examiner

AIR ADMITTANCE VALVE

FIELD

The invention relates to diaphragm valves. More specifically, the invention relates to diaphragm valves and related processes for sealing gaseous fluids.

BACKGROUND

Diaphragm valves are used in multiple industries. A particular type of diaphragm valve, known as an "air admittance valve," is used in a wide variety of plumbing systems, such as apartments, schools, and single-family dwellings. For example, an air admittance valve can be installed on a plumbing system to seal unwanted gases escaping from the plumbing system, but allow air into the plumbing system to prevent negative pressure or a vacuum in the system.

Thus, an air admittance valve functions as a special type of one-way valve to seal in one direction at relatively low pressures, but allow in another direction low pressure gas, such as atmospheric air, to pass around the diaphragm through the center of the valve. However, the valve is generally able to sustain a seal at elevated pressures. With these two extremes, the sealing diaphragm must have some special attributes not normally found in typical valves.

The sealing diaphragm is typically not made of a solid material, because it would either be too hard to initially seal at low pressure or too soft to support a seal at high pressure. The diaphragm generally has a soft and very pliable membrane portion for the low-pressure sealing at almost atmospheric pressure and a hard stiff portion for the high-pressure capability. The interface between the very dissimilar materials of a very pliable membrane and the hard stiff portion is the principal area of commercial failure for this type of valve.

One known and commercially available air admittance valve is a Magic Vent™ air admittance valve, widely received in the industry. The valve has a lower portion as a base, an upper portion as a top or dome, and a screen plate placed therebetween. A diaphragm operatively seals against the screen plate in a downward direction and allows flow in an upward direction. The diaphragm generally has at least one hard center disk generally mounted in a horizontal plane with two circular stems extending at angles therefrom. The stems resemble an axel extending from both sides of the horizontal center disk. The stems ride up and down inside guides on the base and dome as the center disk moves up and down in sealing oscillation. A pliable membrane is molded to and extends radially out beyond the periphery of the hard center disk. The extension beyond the center disk effectuates a seal on the screen plate. The diaphragm is permanently mounted within the body of the air admittance valve. Thus, failures generally necessitate replacement of the entire valve.

The failure generally occurs by leakage at the interface between the hard center disk and the pliable membrane molded laterally around the disk. The membrane material has a very soft surface to satisfy the needs of the low-pressure sealing and does not chemically bond with the center disk material when molded thereto. The coupling is primarily mechanical from the molding process. While the assembly performs well, there is room for improvement.

Another solution is to use essentially a two-part screen plate with one hard, generally open framed, subsection (commonly known as a "spider") that is movable up and down relative to the other part of the screen plate. The diaphragm is a soft, plastic diaphragm and is glued or ultrasonically welded to the spider. The movement of the entire spider and diaphragm assembly effects the seal. The two-step assembly is not cost effective and a single axel design typically allows the diaphragm to tip out of concentric alignment.

Yet another design used by some other commercial manufacturers is to avoid the center disk and membrane design altogether. Instead, the diaphragm is an annular diaphragm and the airflow is reversed inside the body of the valve so that any sealing is done around an annulus, and not through the center of the valve as described above.

Not only do these alternative assemblies raise the costs, but they also provide evidence of the problematic nature associated with these types of valves. Thus, there remains a need for an improved, commercially viable, air admittance valve.

SUMMARY OF THE INVENTION

The present disclosure changes the design and interface of the hard center disk and associated pliable membrane to provide an improved air admittance valve. In some embodiments, the hard center disk includes a hollow stem through which the pliable membrane is molded to flow outwardly beyond the center disk, forming a pliable continuous lateral membrane that can seal a flow path through the valve. The hollow stem functions as an extension runner for the molding and yet is retained as part of the final product to also serve as a guide for the diaphragm movement. The continuous lateral membrane eliminates the sealing interface with the hard center disk of prior designs that is prone to failure. In at least one embodiment, two hard center disks with stems are used, where at least one stem is hollow to allow the membrane to be molded therethrough to produce a diaphragm having a continuous lateral membrane coupled between and to the two center disks. In another embodiment, the continuous lateral membrane can be molded separate from the hollow stem and coupled to the hollow stem by inserting a portion therein.

In various embodiments, the disclosure provides an air admittance valve, comprising: a base; a screen plate having an opening formed therethrough establishing a flow path and having a seat disposed around the opening, the screen plate being coupled to the base; and a diaphragm slidably engaged with the screen plate, comprising a first center disk of a first material having a hollow stem extending at an angle to a plane of the center disk, and a lateral membrane coupled to the first center disk, and having a continuous material sized to extend beyond a perimeter of the center disk and engage the seat across the flow path, the membrane being formed of a second material more pliable than the first material and adapted to be coupled to the center disk through the center disk hollow stem.

The disclosure also provides embodiments of an air admittance valve, comprising: a base; a screen plate coupled to the base, the screen plate comprising a central opening having a seat and a perimeter opening, and wherein the central opening is fluidicly coupled to a first chamber in the valve and the perimeter opening is fluidicly coupled to a second chamber in the valve and the first chamber and second chamber are fluidicly separate apart from the screen plate with the central opening and the perimeter opening; and a diaphragm adapted to sealingly engage the seat of the central opening, comprising a first center disk having a stem extending at an angle to a plane of the center disk, and a continuous lateral membrane coupled to the center disk and sized to extend beyond a perimeter of the center disk, the membrane formed of a material more pliable than the center disk.

BRIEF DESCRIPTION OF THE DRAWINGS

A more particular description, briefly summarized above, may be had by reference to the embodiments illustrated in the appended drawings, forming part of the present specification and described herein. It is to be noted, however, that the appended drawings illustrate only some embodiments described herein and are therefore not to be considered limiting of the disclosure's scope, in that there can be other equally effective embodiments.

DETAILED DESCRIPTION

Figure 1:
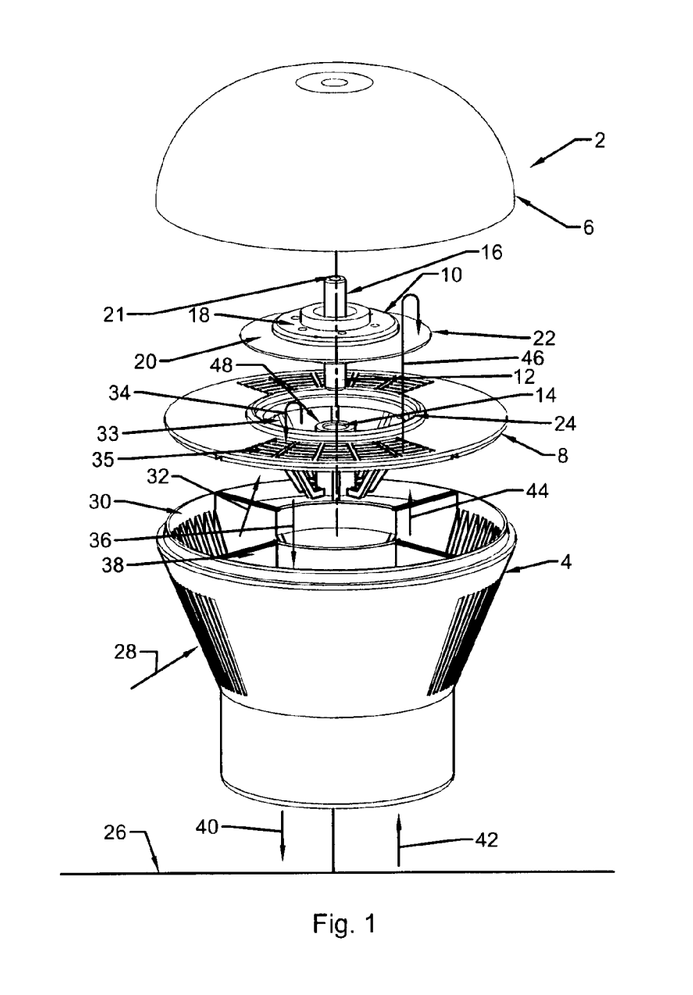
FIG. 1 is a perspective schematic diagram of an assembly of one embodiment of an air admittance valve.

FIG. 1 is a perspective schematic diagram of an assembly of one embodiment of an air admittance valve. An air admittance valve 2 includes a base 4, a top 6 generally termed a "dome", and a screen plate 8 coupled therebetween. The term "coupled," "coupling," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include integrally forming one functional member with another.

The screen plate 8 supports a diaphragm 10 that is operatively engaged with the screen plate. A central portion of the screen plate 8 forms a central opening 33 as a flow path for air entering the valve. The central opening 33 provides a sealing surface, herein a "seat" 24 upon which the diaphragm 10 can seal across the central opening. The screen plate also includes one or more perimeter openings 35 spaced radially outward from the central opening 33, in at least one embodiment. The central opening 33 is fluidicly coupled to a first chamber 30 and the perimeter openings 35 are fluidicly coupled to a second chamber 38. The first chamber 30 and second chamber 38 are fluidicly disconnected from each other except for flow passing through the screen plate between the central opening 33 and perimeter openings 35.

Generally the air admittance valve operates by gravity, partially for a cost efficiency, partially as a response to building code requirements, and partially due to the low pressure sealing capabilities. Thus, generally, the valve 2 will be advantageously mounted in an at least partially vertical position. Likewise, the diaphragm 10 will operate in a vertical direction and seal in a horizontal direction around its periphery, as explained below.

The diaphragm 10 includes a hard center disk 18 extending in a plane laterally relative to a central axis 21 of the diaphragm. The hard center disk 18 is generally formed of a thermal plastic or other structural material. The diaphragm 10 further includes a pliable membrane 20 coupled to the hard center disk 18. Membrane materials can include without limitation any soft pliable material such as silicone, commercially available Kraton brand polymers such as Kraton G, natural rubber, neoprene, and other similarly pliable materials. The pliable membrane 20 extends laterally relative to the central axis 21 of the diaphragm. The periphery 22 of the pliable membrane 20 extends beyond the outer perimeter of the hard center disk 18. In general, the periphery 22 will operatively seal against the seat 24 formed in the screen plate 8.

The diaphragm 10 can include a lower stem 12 disposed on a lower side of the diaphragm. The stem 12 extends at angles to the center disk 18 and generally is aligned longitudinally along the axis 21 to allow the stem to guide the diaphragm in up-and-down sealing oscillation, although the stem can be at some non-zero angle to the diaphragm. The stem 12 can slidably engage a lower guide 14 formed in the screen plate 8. The guide 14 can further limit the downward travel of the diaphragm 10 by a shoulder 48 formed in an upper portion of the guide 14. Similarly, an upper stem 16 can protrude from the diaphragm 10 distally from the lower stem 12 and can engage a similar guide (not shown) formed in the top 6. In some embodiments, the stem 16 is formed with the center disk 18.

In some embodiments, the diaphragm 10 has a second hard center disk, shown in FIG. 2, disposed below the pliable membrane 20, that is distal from the center disk 18 relative to the membrane. The second hard disk can include the stem 12, described above, extending downward therefrom.

In general, the air admittance valve 2 will be coupled to a piping system 26. The piping system can be, for example and without limitation, a drain plumbing system that can operate at atmospheric pressure. Other piping systems can be used with the air admittance valve 2. The term "air" is broadly used herein and includes any gas surrounding or flowing through the air admittance valve 2.

When air is needed in the piping system 26, for example, when a negative pressure or vacuum exists in the piping system 26, the air admittance valve assists in equalizing pressures between an ambient pressure and the internal negative pressure of the piping system 26 in the following manner. Air can enter the air admittance valve 2 in a direction 28 of the air flow into a first chamber 30. Air can flow through the first chamber 30 in a direction 32 up through the central opening 33 of the screen plate 8 to lift the diaphragm 10 from the seat 24. Air can then turn and flow down through the screen plate perimeter openings 35 in a flow direction 34. Air flowing past the screen plate through the opening 35 can continue to flow in a flow direction 36 into a second chamber 38 fluidically connected to the piping system 26. When the pressure is generally equalized, the diaphragm 10 can again settle on the seat 24 of the screen plate 8. The diaphragm 10 when seated on the seat 24 can restrict air flow between the first chamber 30 and the second chamber 38.

If on the other hand, the piping system 26 has a higher pressure than ambient conditions, then the diaphragm 10 can seal the higher pressure in the following manner. Air could flow in a flow direction 42 from the piping system 26 up through the second chamber 38 in a flow direction 44. The air could then flow up through the screen plate 8 and the perimeter openings 35 in a flow direction 46. However, flow would be restricted thereafter by the diaphragm 10 being seated on the seat 24. Thus, air generally would not flow through central opening 33 into the first chamber 30. Such positive pressures can occur, for example without limitation, when sewer gases build up in a drain system. Further, some maintenance operations create positive pressures that could rupture the diaphragm in the absence of its ability to withstand higher pressures. In general, the diaphragm is light enough to open with a very slight amount of negative pressure to allow pressure equalization, yet heavy enough to close with gravity once pressure in the system is equalized. Thus, a low-pressure seal is important for the function of the valve. Without limitation, the air admittance valve construction described herein can withstand pressures of 60 pounds per square inch (psi), although other constructions can yield other pressures and thus is only exemplary.

Figure 2:
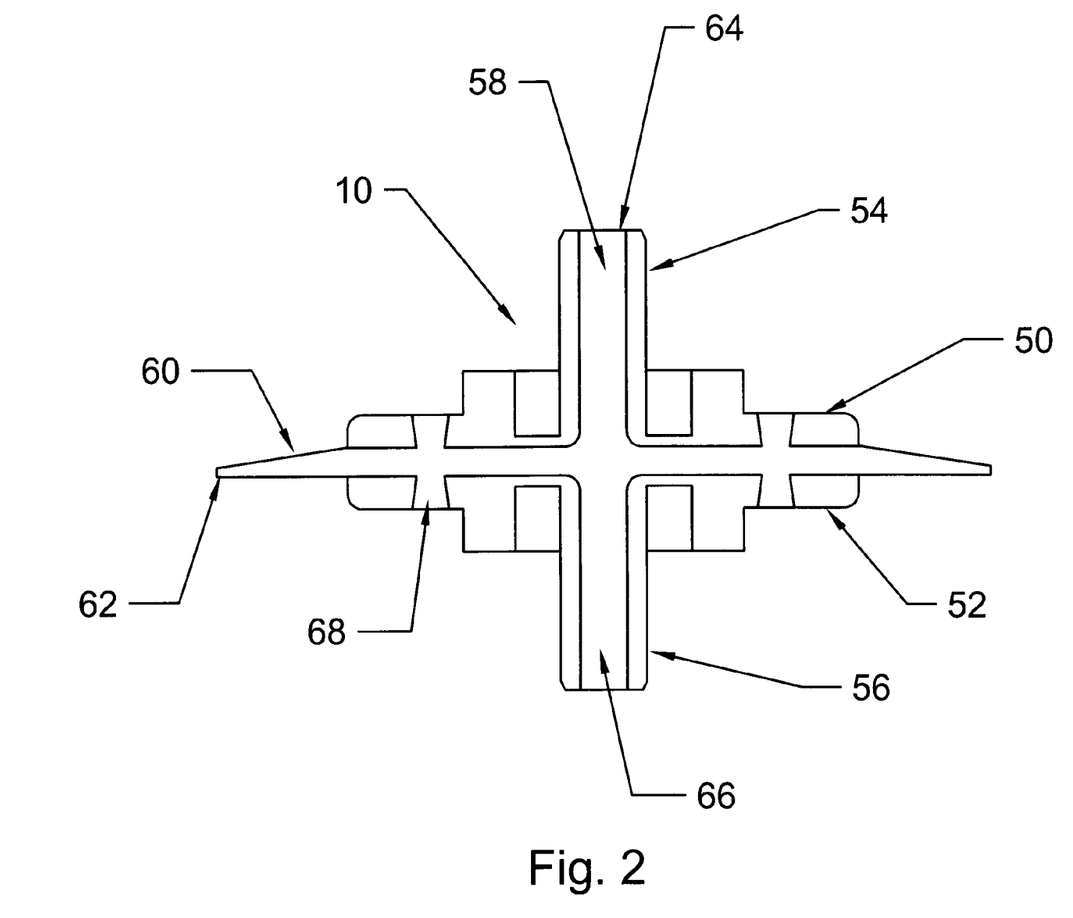
FIG. 2 is a cross-sectional schematic diagram of an embodiment of a diaphragm for the air admittance valve.

FIG. 2 is a cross-sectional schematic diagram of an embodiment of a diaphragm for the air admittance valve. The diaphragm 10 generally includes at least one center disk and a continuous lateral membrane coupled thereto. In the particular embodiment shown in FIG. 2, the diaphragm includes a first center disk 50 (item 18 in FIG. 1) and a second center disk 52 disposed distally from the first center disk with the continuous lateral membrane 60 (item 20 in FIG. 1) disposed therebetween. The first center disk 50 includes a stem 54 (item 16 in FIG. 1). The stem 54 generally includes a hollow portion 58 that allows the passage of material through the first center disk 50. Similarly, the second center disk 52 can include a stem 56 (item 12 in FIG. 1). In this embodiment, both stems 54, 56 can include hollow portions, although it is to be understood that only one stem can have the hollow portion to allow the material for the continuous lateral membrane to be disposed therein.

The continuous lateral membrane 60 can be formed without substantial interruption across the flow path formed by the opening 33 in FIG. 1, so that a single material is used to seal across that flow path without intervening stems, interfaces, and other interruptions to the material. The thickness can vary, but the material itself is continuous. The continuous lateral membrane radically departs from prior efforts that provided an interface between a peripheral portion of the membrane and the center disk and was subject to failure. An edge 62 (item 22 in FIG. 1) of the membrane 60 extends beyond the periphery of the center disks 50, 52. Further, the center disks can include one or more lateral openings 68 to allow the material of the membrane 60 to flow therein to further securely couple the various members together. As will be described below, the molding of the membrane 60 generally leaves a membrane stem 64 in the hollow portion 58 of the center disk 54. The membrane stem 64 assists in coupling the membrane 60 to the center disk 50.

Figure 3A:
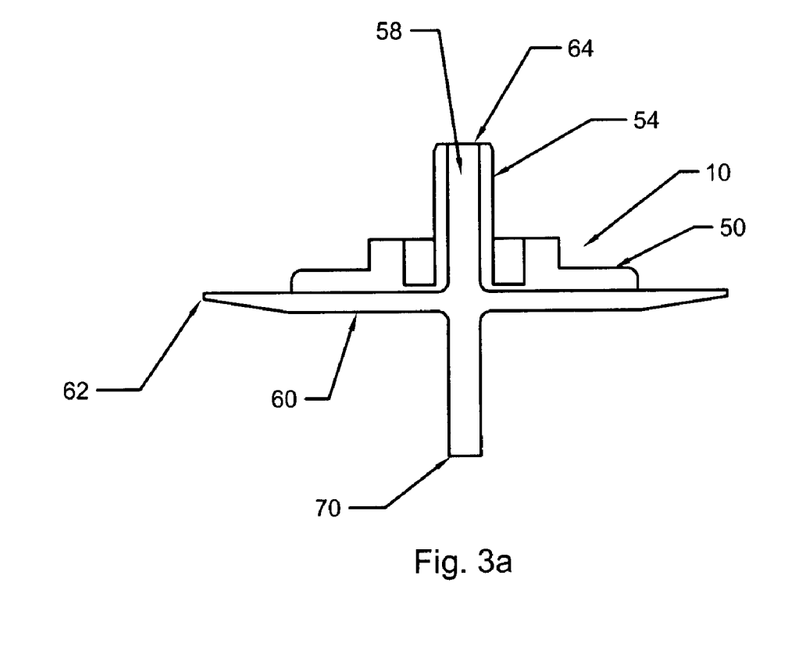
FIG. 3A is a cross-sectional schematic diagram of another embodiment of the diaphragm.

FIG. 3A is a cross-sectional schematic diagram of another embodiment of the diaphragm. The diaphragm 10, as described above, generally includes at least one center disk 50 and a continuous lateral membrane 60. Some embodiments can use a single center disk 50 with its corresponding stem 54, which members have been described above. The continuous lateral membrane 60 can be coupled thereto through the hollow portion 58 of the stem 54. The continuous lateral membrane 60 can include an edge 62 that extends beyond the periphery of the center disk 50.

Further, in some embodiments, it can be advantageous to retain a two-stem configuration. If an additional stem is desired, the stem can be formed from the membrane material itself. The mold that is used to form the membrane 60 can include a cavity to additionally form the membrane stem 70. Again, this differs from the prior efforts in that there is no interface across the lateral surface of the membrane 60 that forms a discontinuity. The membrane is continuous across its lateral sealing surfaces.

Figure 3B:
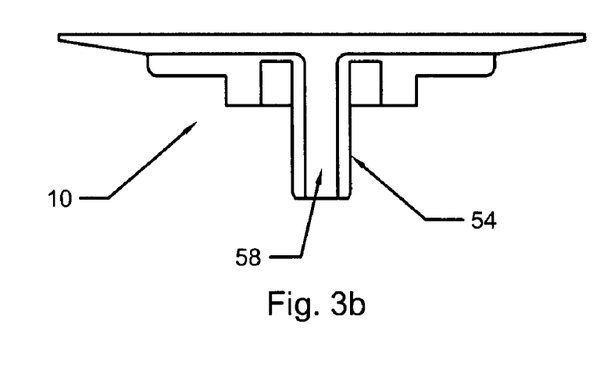
FIG. 3B is a cross-sectional schematic diagram of another embodiment of the diaphragm similar to the one shown in FIG. 3A.

In yet other embodiments, such as shown in FIG. 3B, a single stem, such as stem 54, can be used to adequately guide the diaphragm in the diaphragm's up and down oscillations. Thus, membrane material could flow through the hollow portion 58 of the stem 54 and extend laterally therefrom without forming the membrane stem 70, shown in FIG. 3A.

In some embodiments, the membrane 60 can be formed independent of the center disk 50. For example, the membrane 60 could be formed in a mold to have the continuous lateral configuration described herein. The membrane could be formed and the membrane stem 64 inserted subsequent to molding into the hollow portion 58 of the stem 54. The membrane could be formed and also coupled with the center disk 52 in like fashion. If the membrane 60 is subsequently attached to one or more of the center disks, a "tail" extension of material can be formed on the membrane stem 64 that is smaller in diameter than the membrane stem. The tail can be inserted into the hollow portions of the one or more stems and extend therethrough to facilitate pulling the membrane stem 64 into the one or more hollow portions.

Figure 4:
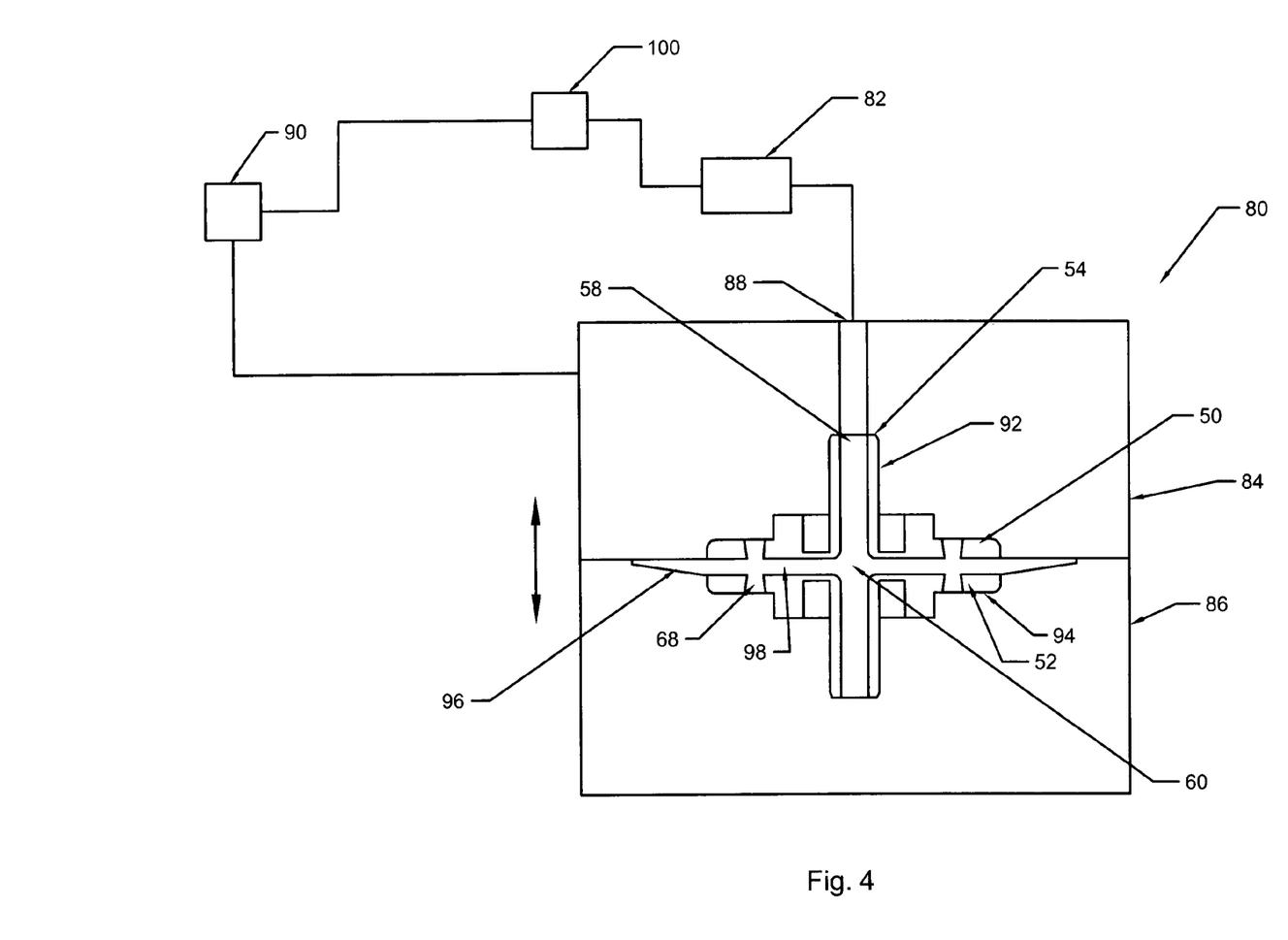
FIG. 4 is a cross-sectional schematic diagram of a molding system for one embodiment of the diaphragm.

FIG. 4 is a cross-sectional schematic diagram of a molding system for one embodiment of the diaphragm. The molding system 80 includes one or more material supplies, one or more molds with dies, and one or more associated controllers. For example, the molding system 80 can include a membrane material supply 82 fluidically coupled to a first mold 84, a second mold 86, or a combination thereof. The first mold 84 can, for example, include a molding runner 88 fluidically coupled to the membrane material supply 82. The first mold 84 can include a center disk cavity 92 into which a center disk 50 can be placed. Similarly, the second mold 86 can include a cavity 94 into which a second center disk 52 can be inserted, if two center disks are used. If two center disks 50, 52 are used to produce the diaphragm 10, then the cavities 92, 94 are sized to allow a spacing 98 therebetween.

Further, the first mold 84, the second mold 86, or a combination thereof can include a membrane cavity 96 extending radially outward from the center disk cavity 92, and if applicable, cavity 94. Thus, the continuous lateral membrane 60 can be formed between the center disks 50, 52 and extend radially outward into the membrane cavity 96 without an interface that disrupts the continuous material of the membrane. *** The cavity 94 can be sized to accommodate a center disk 52 placed therein, sized to form a membrane stem 70, shown in FIG. 3, or eliminated if the membrane stem 70 or center disk 52 is not desired for the particular embodiment.

In one embodiment of the molding system 80, the system can include a center disk supply 90 coupled to the first and/or second molds 84, 86 to supply the center disks to the molds as desired. Further, the molding system 80 can include a controller 100 to control the supplies, temperature, sequence, and other functions as would be known to those with ordinary skill in the art, given the disclosure contained herein.

In operation, one or more center disks such as center disks 50, 52 would be supplied to the molds 84, 86. The center disks could be supplied automatically from the center disk supply 90 in a production line. Such automation could be directed by the controller 100. When at least one center disk was inserted into the appropriate cavity of the molds 84, 86, the molds could be closed and prepared for molding. The membrane material supply 82 could be directed to provide membrane material to the molding runner 88. Often, the molding runner 88 is heated to maintain the molding material in a liquid state and reduce waste. The membrane material could be injected through the molding runner 88 into the hollow portion 58 of the stem 54. Thus, the stem 54 functions as an extension of the runner 88. After molding the continuous lateral membrane 60 and the formed diaphragm is removed, the stem 54 can also function as a stem to guide the diaphragm as described above. This combined use of the stem is also unique.

Thus, the runner 88 can allow membrane material to flow into the hollow portion 58 of the stem 54 and outwardly through the spacing 98 between the cavities 92, 94 and into the membrane cavity 96. The continuous fluidicly connected flow path allows the creation of the continuous lateral membrane 60 described herein. Once the membrane is formed, the molds 84, 86 can be separated and the membrane 60 removed with the center disk(s). The above operation also has the benefit of positively forcing at least a portion of the air in the cavities from a central portion of the diaphragm radially outward through the membrane cavity 96. Forcing the air out makes a higher integrity membrane and a more uniform structure.

If only one center disk 50 is used, the similar principles apply where the membrane material flows through the hollow portion 58 and outwardly into the membrane cavity 96 with the cavity 94 adjusted accordingly. The membrane material can also flow into any lateral opening 68 formed in the one or more center disks 50, 52.

Further, if the continuous lateral membrane 60 is formed independent of the center disk 50 and coupled thereto at a subsequent time, the one or more cavities 92, 94 can be adjusted appropriately to create the continuous lateral membrane 60. The membrane 60 can be coupled subsequently to the one or more center disks.

While the foregoing is directed to various embodiments of the present invention, other and further embodiments may be devised without departing from the basic scope thereof. Other embodiments within the scope of the claims herein will be apparent to one skilled in the art from consideration of the specification and practice of the invention as disclosed herein. For example, the shape of the membrane can vary as desired to sealingly engage a seat. Further, the shape and size of the air admittance valve and especially the base and top can vary. It is intended that the specification, together with the example, be considered exemplary only, with the scope and spirit of the invention being indicated by the claims that follow.

The various methods and embodiments of the invention can be included in combination with each other to produce variations of the disclosed methods and embodiments, as would be understood by those with ordinary skill in the art, given the understanding provided herein. Also, various aspects of the embodiments could be used in conjunction with each other to accomplish the understood goals of the invention. Also, the directions such as "top," "bottom," "left," "right," "upper," "lower," and other directions and orientations are described herein for clarity in reference to the figures and are not to be limiting of the actual device or system or use of the device or system. Unless the context requires otherwise, the word "comprise" or variations such as "comprises" or "comprising", should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. Further, the order of steps can occur in a variety of sequences unless otherwise specifically limited. The various steps described herein can be combined with other steps, interlineated with the stated steps, and/or split into multiple steps. Additionally, the headings herein are for the convenience of the reader and are not intended to limit the scope of the invention.

Further, any references mentioned in the application for this patent as well as all references listed in the information disclosure originally filed with the application are hereby incorporated by reference in their entirety to the extent such may be deemed essential to support the enabling of the invention. However, to the extent statements might be considered inconsistent with the patenting of the invention, such statements are expressly not meant to be considered as made by the Applicants.

The invention claimed is:

1. An air admittance valve, comprising:
   a. a base;
   b. a screen plate having an opening formed therethrough establishing a flow path and having a seat disposed around the opening, the screen plate being coupled to the base; and
   c. a diaphragm slidably engaged with the screen plate, comprising:
      i) a first center disk of a first material having a hollow stem extending at an angle to a plane of the first center disk; and
      ii) a continuous lateral membrane coupled to the first center disk, and having a continuous material sized to extend beyond a perimeter of the first center disk and engage the seat across the flow path, the continuous lateral membrane being formed of a second material more pliable than the first material and adapted to be coupled to the first center disk through the first center disk hollow stem.

2. The valve of claim 1, wherein the opening comprises a flow path for air entering the valve.

3. The valve of claim 1, wherein the continuous lateral membrane further comprises a membrane stem coupled to an inside portion of the hollow stem of the first center disk.

4. The valve of claim 1, further comprising a second center disk coupled to the continuous lateral membrane distally from the first center disk.

5. The valve of claim 4, wherein the continuous lateral membrane is continuously disposed between the first center disk and second center disk.

6. The valve of claim 4, wherein the second center disk further comprises a stem adapted to guide the diaphragm in reciprocating movement.

7. The valve of claim 1, wherein the continuous lateral membrane comprises a membrane stem adapted to guide the diaphragm in reciprocating movement.

8. The valve of claim 1, wherein the first center disk comprises a lateral opening radially outward from the hollow stem of the first center disk to receive a portion of the continuous lateral membrane for coupling to the continuous lateral membrane.

9. The valve of claim 1, wherein the first center disk hollow stem is adapted to guide the diaphragm in a first direction.

10. The valve of claim 1, wherein the first center disk hollow stem comprises a runner extension for a runner in a mold adapted to mold the continuous lateral membrane from membrane material.

11. The valve of claim 1, wherein the screen plate comprises a seat and the continuous lateral membrane is sized to sealingly engage the seat.

12. The valve of claim 1, wherein the screen plate comprises a central opening having a seat and a perimeter opening, and wherein the central opening is fluidicly coupled to a first chamber in the valve and the perimeter opening is fluidicly coupled to a second chamber in the valve and the first chamber and second chamber are fluidicly separate apart from the screen plate with the central opening and the perimeter opening.

13. A molding system comprising one or more molds and a membrane material supply, the system adapted to mold the continuous lateral membrane in the valve of claim 1.

14. An air admittance valve, comprising:
a base;
a screen plate coupled to the base, the screen plate comprising a central opening having a seat and a perimeter opening, wherein the central opening is in fluid communication with a first chamber in the valve and the perimeter opening is in fluid communication with a second chamber in the valve; and
a diaphragm adapted to sealingly engage the seat of the central opening, the diaphragm including
   a first center disk having a stem extending at an angle to a plane of the center disk,
   a continuous lateral membrane coupled to the first center disk and sized to extend beyond a perimeter of the first center disk, and
   a second center disk coupled to the continuous lateral membrane distally from the first center disk,
   wherein the continuous lateral membrane is formed of a material more pliable than the first and second center disks and is continuously disposed between the first center disk and second center disk.

15. An air admittance valve, comprising:
a base;
a screen plate coupled to the base, the screen plate comprising a central opening having a seat and a perimeter opening, wherein the central opening is in fluid communication with a first chamber in the valve and the perimeter opening is in fluid communication with a second chamber in the valve; and
a diaphragm adapted to sealingly engage the seat of the central opening, the diaphragm including
   a first center disk having a stem extending at an angle to a plane of the center disk, and
   a continuous lateral membrane coupled to the first center disk and sized to extend beyond a perimeter of the first center disk,
   wherein the continuous lateral membrane is formed of a material more pliable than the first and second center disks and comprises a membrane stem adapted to guide the diaphragm in reciprocating movement.

16. An air admittance valve, comprising:
a base;
a screen plate coupled to the base, the screen plate including an opening formed therethrough establishing a flow path and a seat disposed around the opening; and
a diaphragm engageable with the screen plate, the diaphragm including
   a first center disk including at least one membrane adherence opening formed therein and a first stem extending at an angle to a plane of the first center disk,
   a second center disk including at least one membrane adherence opening formed therein and a second stem extending at an angle to a plane of the second center disk in a direction opposite to the direction of the first stem, and
   a lateral membrane extending between and coupled to the first and second center disks, the lateral membrane extending into at least one membrane adherence opening of each of the first and second center disks, being constructed of a material that is more pliable than the first and second center disks and capable of releaseably engaging the seat around the flow path.

17. The valve of claim 16, wherein at least one among the first and second stems is adapted to guide the diaphragm in reciprocating movement.

18. The valve of claim 16, wherein both the first and second stems are adapted to guide the diaphragm in reciprocating movement.

19. The valve of claim 16, wherein at least one among the first and second stems is at least partially hollow.

20. The valve of claim 19, wherein the lateral membrane extends at least partially into at least one among the first and second stems.

21. The valve of claim 19, wherein the at least partially hollow stem of at least one among the first and second stems comprises a runner extension for a runner in a mold adapted to mold the membrane from membrane material.

* * * * *